Figure 1:
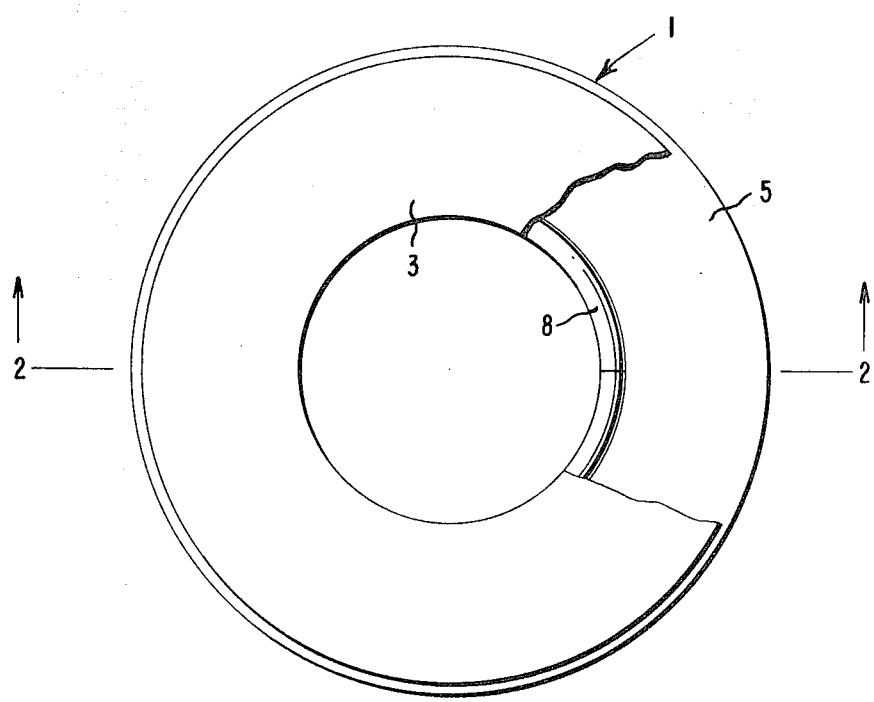

United States Patent

[11] 3,595,589

| [72] | Inventor | Thomas Knight Henderson<br>Beaumont, Tex. |
|---|---|---|
| [21] | Appl. No. | 853,153 |
| [22] | Filed | Aug. 26, 1969 |
| [45] | Patented | July 27, 1971 |
| [73] | Assignee | E.I. duPont de Nemours and Company<br>Wilmington, Del. |

[54] COMPOSITE GASKET
5 Claims, 3 Drawing Figs.

| [52] | U.S. Cl. | 277/235 B |
|---|---|---|
| [51] | Int. Cl. | F16j 15/10 |
| [50] | Field of Search | 277/229, 235 |

[56] References Cited
UNITED STATES PATENTS

| 1,843,297 | 2/1932 | Oven | 277/235 B |
| 2,868,575 | 1/1959 | Hawxhurst | 288/16 |

FOREIGN PATENTS

| 474,424 | 10/1937 | Great Britain | 277/235 B |

Primary Examiner—Robert I. Smith
Attorney—Louis Del Vecchio

ABSTRACT: A composite gasket consisting essentially of a resilient core in the form of an annular ring and a seamless plastic jacket covering and closely fitting the inner periphery and adjacent faces of the core. The core can be formed by an outer annular ring and an inner annular split ring or, alternatively, by two equal semiannular rings.

PATENTED JUL 27 1971

3,595,589

INVENTOR
THOMAS KNIGHT HENDERSON

BY *Joseph V. Vecchio*

ATTORNEY

COMPOSITE GASKET

BACKGROUND OF THE INVENTION

In constructing chemical process equipment using glass lined metal pipes, sections of pipe are mated together by flanges. The glass lining is continuous through the pipe and on to the face of the flange. The corner point where the glass is bent from the direction of flow in the pipe onto the face of the flange is rounded. This rounded corner creates an annular depression at the inner periphery of the face of the flange. A resilient gasket resistant to the chemical materials that contact it is interposed between the mated flanges to be deformed to fit the irregularities in the face of the flange and provide a fluid seal. The gasket is constructed so that its inner diameter is the same size as the inside diameter of the glass lined pipe. However, only the portions of the flanges which mate actually support the gasket, therefore, the inside annular portion of the gasket, which extends into the annular depression at the inner periphery of the face of the flange is left unsupported.

It is known that gaskets can be made for use in the assembly of glass lined pipes which gaskets have an outer jacket resistant to the materials that contact the gasket. One type of jacketed gasket is made by an interlocking assembly of preformed parts in the following manner. A central core of a ringlike configuration having a rectangular cross section is enveloped by a jacket having a U-shaped or a V-shaped cross section covering the inner periphery and adjacent faces of the core. The gasket is assembled by laterally distorting the outer jacket and pushing or pulling one of the parallel sides through the central opening of the core after which the distorted jacket will assume its original configuration and envelope the core.

In attempting to make such a gasket, it has been found that if the core member is relatively rigid as it is when it contains a metallic ring member embedded in it and if the jacket is made of a relatively rigid thermoplastic material such as tetrafluoroethylene, it is necessary to make the inside diameter of the core member larger than the inside diameter of the jacket in order to allow enough room to pull the jacket through the core to assemble the gasket without having to distort the jacket so much that permanent damage results to the jacket such as wrinkling. When this is done an ever larger empty space is created between the inside periphery of the core and the annular portion of the inside periphery of the jacket.

Therefore, a jacketed gasket made by conventional means contains a space in the inside annular portion of the gasket where the core does not completely fill the jacket and when this gasket is interposed between the mated flanges of a glass-lined pipe the inside annular portion of the gasket containing the air space is dependent or unsupported by the metal portion of the flange. When in use, high pressure internal to the pipe can cause collapse and tearing of the unsupported portion of the gasket resulting in destruction of the gasket.

There is a need, therefore, for a gasket that can be used in mating glass-lined pipes that can withstand the destructive pressures and pressure changes created when transporting liquids under high pressure.

SUMMARY OF THE INVENTION

Accordingly, this invention provides a composite gasket, for use in connecting pipes, consisting essentially of (a) a resilient annular core member and (b) a jacket covering and closely fitting the inner periphery and adjacent sides of the core. The core can be formed by an outer annular ring and an inner annular split ring or alternatively by two equal semiannular rings.

DETAILS OF THE INVENTION

Figure 2:
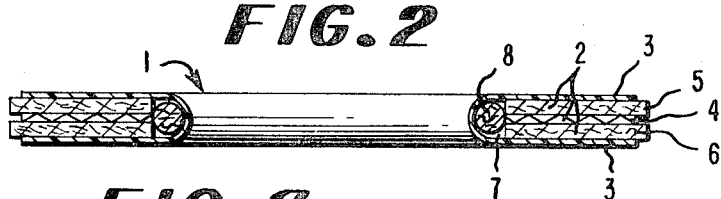
Figure 3:
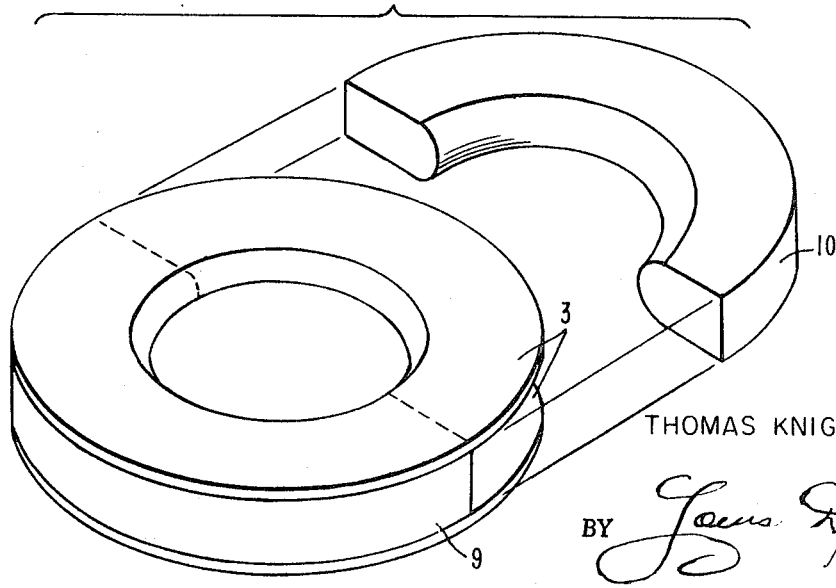

The details of this invention will now be described in conjunction with the accompanying drawings. The drawings illustrate a typical embodiment and similar parts have similar reference numerals throughout the several drawings. Referring to the drawings, FIG. 1 is a plan view of a gasket 1 made in accordance with this invention with part of the jacket 3 broken away for the purpose of illustration, FIG. 2 is a section view of the gasket shown in FIG. 1, and FIG. 3 is an exploded view of an alternate split-ring embodiment wherein the core member is divided into two substantially equal semiannular rings 9 and 10.

The gasket is made of a composite core and a jacket. The core is made of an outer annular ring 2 and an inner annular split ring 8. The composite sections of the outer annular ring 2 are (a) an annular metallic section 4 having annular corrugations, sandwiched between (b) two annular asbestos sections 5 and 6. The core is enveloped by the jacket which has a U-shaped configuration covering and closely fitting the inner periphery and adjacent sides of the core. Annular space 7 formed between the inner periphery of the outer annular ring and the jacket accommodates the inner annular split ring 8.

The outer annular core member 2 can be made of a single resilient material or constructed as a composite structure made of resilient material that is reinforced. Useful resilient materials include natural rubber, synthetic elastomers, cork or asbestos. Reinforced core members can be constructed by methods such as (a) impregnating a resilient material with metal wool, (b) enveloping a metallic member such as wire mesh, a metal plate or a corrugated metal plate with resilient material or (c) sandwiching the metallic member between resilient material.

The jacket can be made of a plastic material that can be shaped into the desired U-shaped configuration to support the core member, and capable of withstanding processing temperatures. Other requirements of the material used to make the jacket may be dictated by the particular situation. For example, if the gasket is used in a flange, mating glass-lined pipe carrying a liquid diene monomer, it has been found that the jacket material ought to be nonporous because liquid monomer will collect in the pores, polymerize, tear the jacket and destroy the effectiveness of the jacket.

Useful materials for making the jacket include fluorinated ethylene-propylene resins, tetrafluoroethylene fluorocarbon resins, polypropylene, polyethylene and polyvinyl chloride resins. The preferred material for high-temperature corrosive atmospheres is fluorinated ethylene-propylene resin because it is relatively nonporous.

The inner annular split ring 8 can be made from resilient materials such as asbestos, natural rubber, synthetic elastomers, plastics, etc. The split ring is preferably designed to have a cross section that duplicates the space where it is to be used, namely, the annular space formed between the inner periphery of the core and the jacket. This space has the general cross-sectional configuration of a semicircle. For convenience and economics, however, the cross-sectional configuration of the split ring can be a circle as shown in the typical embodiment illustrated in the drawings. Although this typical embodiment does not completely fill the annular space it does provide enough additional support to the gasket to make the gasket serviceable at unexpected pressures and for unexpectedly long periods of time.

The gasket is assembled in the following manner. The inner annular split ring is positioned in and snugly fitting against the jacket. The outer annular core is placed on top of or adjacent the jacket in axial alignment. The dependent side of the jacket adjacent the outer annular core is distorted and forced through the opening in the outer core after which the distorted side will move back to its initial position of parallelism with the other dependent side of the jacket completely enveloping the core on three sides including the inner periphery and the two adjacent sides.

In an alternate embodiment the core member can be two substantially equal semiannular rings. The inside periphery of the core is about equal to the inside periphery of the jacket so that the center of the core when installed fits snugly against the jacket. The gasket is assembled mating the rings inside of the jacket.

EXAMPLE

The gasket illustrated in FIGS. 1 and 2 is constructed in accordance with this invention. The outer annular ring is a composite ring having an outside diameter of 4⅜ inches, an inside diameter of 2⅜ inches and a thickness of five-sixteenths of an inch. The composite outer ring is made of a metal section having annular corrugations and an effective thickness of one-sixteenth of an inch sandwiched between two asbestos sections each two-sixteenths of an inch thick. The resilient inner annular split ring is five-sixteenths of an inch in diameter about 7½ inches long and made of asbestos. It is positioned inside the jacket between the inner periphery of the core and the jacket. The core member is surrounded on three sides by the jacket made of fluorinated ethylene-propylene resin having an outside diameter of 4⅜ inches and an inside diameter of 2 inches. The thickness of one dependent side of the jacket is one thirty-second of an inch.

For comparison, a conventional gasket is constructed in a similar manner as that described above except that the inner annular split ring is not present leaving an annular space between the inner periphery of the core and the jacket.

Both types of gaskets are used in a high-pressure glass-lined pipe having an inside diameter of 2 inches and carrying a mixture of diene monomers and a noble metal catalyst in acid at a temperature of 70° C. The conventional gasket lasts for about 1 month at a pressure of 300 p.s.i.g. whereas the gasket made according to this invention lasts for at least 10 months at 450 p.s.i.g. and can be used at pressures up to 2,100 p.s.i.g.

What I claim is:

1. A composite gasket, for use in connecting pipes, consisting essentially of (a) a resilient annular core member and (b) a jacket of a nonporous, plastic material covering and closely fitting the inner periphery and adjacent sides of the core.

2. A composite gasket of claim 1, for use in connecting pipes, consisting essentially of (a) a resilient annular core member and (b) a seamless jacket having a U-shaped cross section made of nonporous, plastic material covering and closely fitting the inner periphery and adjacent sides of the core thereby completely enveloping the core on three sides.

3. The composite gasket of claim 2, in which the core is divided into two substantially equal semiannular rings.

4. The composite gasket of claim 2 in which the core is formed by an outer annular ring and an inner annular split ring closely fitting between the inner periphery of the outer ring and the inner periphery of the jacket.

5. The composite gasket of claim 4 wherein (a) the outer annular ring is made of a metallic section having annular corrugations sandwiched between two sections of asbestos; (b) the inner annular split ring is made of asbestos; and (c) the jacket is made of fluorinated ethylene propylene.